(No Model.)
M. G. COOK.
SCALE.
No. 267,776.     Patented Nov. 21, 1882.
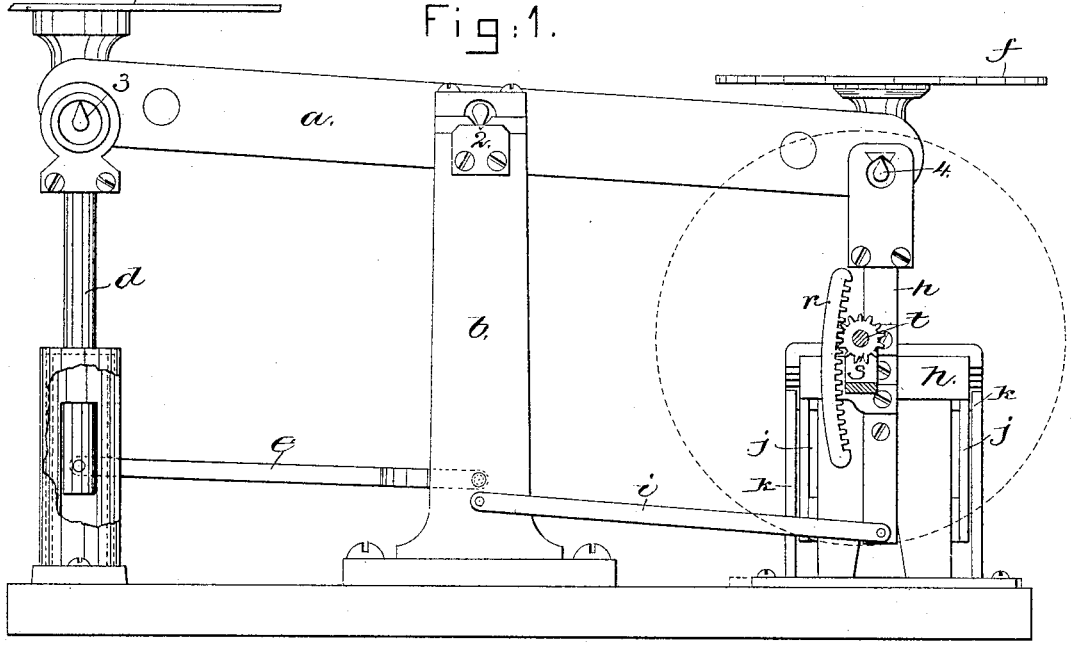
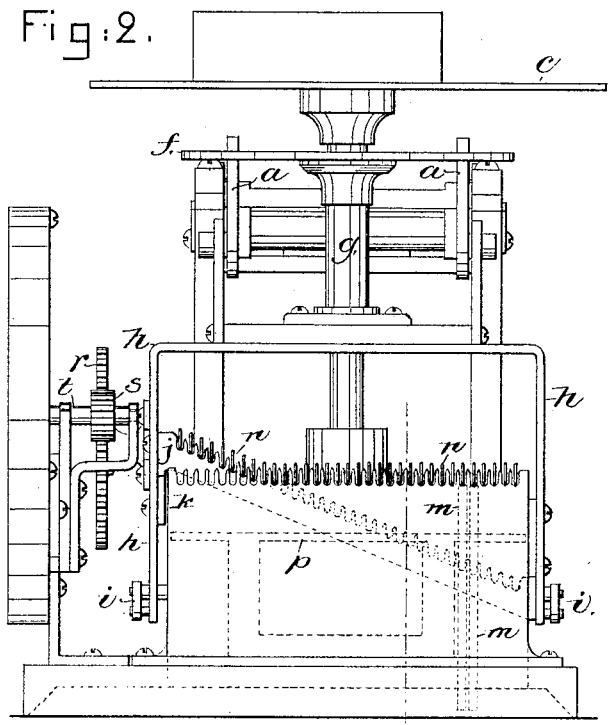
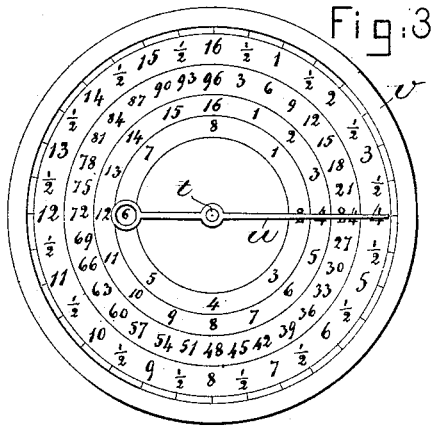
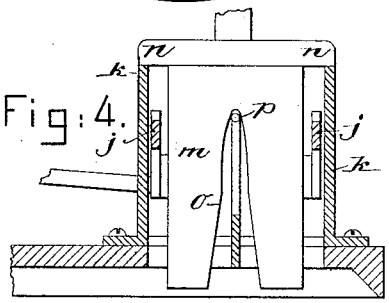
Witnesses.
Inventor.
Moses G. Cook.
by Crosby Gregory Attys.

UNITED STATES PATENT OFFICE.

MOSES G. COOK, OF ASHFIELD, ASSIGNOR OF ONE-HALF TO JOSEPH N. SMITH, OF LYNN, MASSACHUSETTS.

SCALE.

SPECIFICATION forming part of Letters Patent No. 267,776, dated November 21, 1882.

Application filed May 24, 1882. (No model.)

*To all whom it may concern:*

Be it known that I, MOSES G. COOK, of Ashfield, county of Franklin, State of Massachusetts, have invented an Improvement in Scales, of which the following description, in connection with the accompanying drawings, is a specification.

My invention relates to a scale or weighing apparatus, and is embodied in an apparatus of that kind in which one arm of a scale beam or lever has equal weights successively applied thereto by the movement of the said lever caused by applying the article to be weighed to a pan or platform carried by the opposite arm of the said lever.

The apparatus herein shown is especially intended for weighing mail-matter. In scales for this purpose as heretofore commonly made fractions of weights smaller than a half-ounce have been neglected—as, for instance, an article weighing a certain number of half-ounces and a fraction thereof has been rated as weighing one more half-ounce than the said number of complete half-ounces.

The invention consists in the combination, with a scale beam or lever having weight-lifting bars and a series of weights adapted to be successively applied thereto during the movement of the said beam and supporting-plates for the said weights when removed from the said lifting-bars, of an indicating-pointer actuated by the said scale-beam and co-operating with a dial showing the weight of the article to the nearest half-ounce, and also the official charge for carrying different classes of mail-matter of the weight indicated by the pointer.

The invention consists, also, in the construction of the weights and devices by which they are successively applied to and removed from the scale-beam. The said weights are made as flat plates provided with holding-lugs which are received in corresponding notches in the weight-holding plates. The movable scale-beam is provided with an inclined weight-lifting device having notches to receive the supporting-arms of the said weights, the said notches corresponding in position with those of the weight-holding plates. A suitable guide operates to place the weights in proper position when transferred from the weight-lifting bars to the weight-supporting plate.

Figure 1 is a side elevation of a scale or weighing apparatus constructed in accordance with this invention, with the dial removed to show the means for actuating the pointer-carrying shaft; Fig. 2, an end view thereof; Fig. 3, a face view of the dial; and Fig. 4, a detail showing the weights and their lifting and supporting devices in section on the line $x\,x$, Fig. 2, looking toward the right.

The scale-beam $a$, pivoted at 2 on the standard $b$, is provided at one end with the usual pan or platform, $c$, for receiving the article to be weighed, the said platform being supported upon a pivot, 3, at the end of the scale-beam, in the usual manner, and provided with a standard, $d$, guided by a radius-bar, $e$, in the oscillations of the scale-beam $a$. The beam $a$ is provided at its other end with a similar platform, $f$, mounted on the standard, $g$, secured to frame $h$, (see Fig. 2,) suspended from the beam $a$ on V-shaped bearings 4, connected therewith. The lower end of the frame $h$ is connected with radius-bars $i$, which act to retain the frame $h$ in substantially vertical position during the oscillations of the said scale-beam. The said frame-work $h$ is provided with two parallel weight-lifting bars, $j$, provided with a series of notches at their upper edges, as shown, and so inclined that the said notches will be successively brought to a given level as the said frame is raised by the depression of the platform $c$ at the other end of the scale, such depression being caused by applying to the said platform the article to be weighed. The frame-work of the apparatus, near the line of movement of the bars $j$, is provided with stationary weight-supporting plates $k$, notched at their upper edges to correspond in position and number with the notches of the said bars $j$. In the normal position of the scale, the platform $c$ being then unoccupied, the bars $j$ are maintained wholly below the upper surface of the weight-supporting plates $k$, with the highest notch of the said bars $j$ on a level with or just beneath the corresponding notches at the left of the said plates, viewing Fig. 2.

The weights $m$ consist of flat plate-shaving projections $n$, extended into notches of the plates $k$, the said plates being of sufficient width to enter freely between the bars $j$, as shown in Fig. 4.

A weight, $m$, suspended in a certain pair of notches of plate $k$, will have the projections $n$ held in line with and above corresponding notches in the bars $j$, so that when the bars $j$ are in their normal position below the upper edges of the plates $k$ any tendency of the said bars $j$ to rise under the action of a weight placed in the pan $c$ will be resisted by the weight $m$, first engaged in the highest notch of the said bars, and will prevent any movement of the scale-beam unless the article placed on the platform $c$ is heavier than the said weight $m$. If, however, the said article is heavier than one of the said weights $m$, it will cause the beam $a$ to turn far enough to lift the said first weight and cause the bars $j$ to be moved up to the next weight, and the scale-beam will be then held stationary unless the article placed in the pan $c$ overbalances two of the said weights. In this way, when an article is placed on the platform $c$, the beam will be moved until the bars $j$ lift in succession a sufficient number of weights $m$ to balance the said article, the last weight applied not, however, being actually lifted or transferred from the plates $k$ to the bars $j$. The upward movement of the said bars $j$ under the weight of different articles applied to the platform $c$ will, it will be seen, be checked or stopped at certain definite points, according to the weight of the article, the said bars $j$ gradually picking up and lifting one weight after another until a sufficient number of said weights have been lifted to counterbalance the weight of the article on the platform $c$. When the bars $j$ return to their normal position, after removing the article just weighed from the platform $c$, the holding-arms $n$ of the weights $m$ are again returned into the notches of the weight-supporting plates $k$ as the bars $j$ sink from beneath them, and each weight is thus always transferred back and forth into and from the same notches in the plates $k$ and bars $j$.

The said weights are provided with deep notches $o$, which, in co-operation with a guide, $p$, (see Fig. 4,) mounted on the frame-work, serves to place them in a central position between the plates $k$ as they are deposited thereon by the depression of the bars $j$.

The frame $h$ is provided with a pointer-actuating bar, $r$, preferably toothed to mesh with a pinion, $s$, on the arbor $t$, provided with the pointer $u$, which co-operates with a dial, $v$, having a series of concentric graduated circles, as shown, the said pointer thus receiving a movement corresponding with the movement of the frame $h$ and connected weight-lifting bars $j$ when an article is applied to the platform $c$. The outermost circle of the said dial is provided with divisions corresponding to the movement of the pointer that takes place when the bars $j$ are moved a distance equal to the difference in the level between two of its successive weight-receiving notches, the said divisions thus corresponding to the number of weights $m$ applied to the bars $j$. The pointer is set opposite the first division when the bars $j$ are in their lowest position, and will consequently remain, indicating one-half when any article weighing less than one of the weights $m$ is placed on the platform $c$, this being the proper indication, as any article or letter weighing less than half an ounce is rated as if it weighed one half-ounce. If the article is sufficient to overbalance one weight, the beam will move until the bar $j$ is stopped by the second weight, and the pointer in the said movement will be brought opposite the second division, thus indicating that the article is rated as an ounce, although it may weigh only a small fraction over a half an ounce. The second circle is provided with figures indicating the amount of postage for sealed letters, they increasing three cents at each division of the outer circle. The other circles show the prices of other classes of postal matter—namely, one cent for an ounce and one cent for each two ounces or fraction thereof.

By making the weights in the shape of flat plates, as shown, a very large number can be placed in a small space and be conveniently transferred from the supporting-plates to the lifting-bars, and vice versa.

The apparatus is shown as provided with thirty-two weights, and the pointer will consequently indicate any weight less than one pound to the nearest half-ounce in excess of the said weight. If it should be desired to use the apparatus for other articles except mail-matter, the pointer might be set at zero-point when the scale is in its normal position, and the scale would then indicate to the nearest half-ounce under the full weight of the article.

Should it be desired to weigh articles heavier than the entire series of weights $m$, additional counterbalancing-weights can be placed on the platform $f$. For instance, if a pound-weight be placed on the said platform $f$, the pointer $u$ will indicate the fraction over a pound, and by adding successive one-pound weights to the platform $f$ any article can be weighed to the nearest half-ounce, the only limit being the actual strength of the apparatus.

I claim—

1. In a scale or weighing apparatus, the combination, with the scale-beam provided with notched weight-lifting bars, of the corresponding notched weight-supporting plates and series of flat weights provided with projections adapted to be received in the notches of the said bars and plates and to be transferred from one to the other in the movement of the scale-beam, substantially as described.

2. The series of flat weights provided with guiding-notches, combined with the weight-lifting bars and weight-supporting plates, and the guide co-operating with the said notches, whereby the said weights are properly transferred from the former to the latter, substantially as described.

3. The dial having figures to indicate the amount in half-ounces and the number of postage-stamps required to take that number of half-ounces of mailable matter through the mails, a pointer co-operating with the said dial, and a shaft to carry the said pointer, combined with a scale-beam having connected lifting-bars, a series of weights, weight-supporting plates, from which the said weights are taken and upon which they are placed in succession, as described, and with means between the said scale-beam and the pointer-carrying shaft to rotate the said pointer, substantially as and for the purpose described.

In testimony whereof I have signed my name to this specification in the presence of two subscribing witnesses.

MOSES G. COOK.

Witnesses:
G. W. GREGORY,
B. J. NOYES.